(12) United States Patent
Shelton

(10) Patent No.: US 8,474,176 B2
(45) Date of Patent: Jul. 2, 2013

(54) NIT STRIPPING DEVICE AND METHOD

(76) Inventor: Amy Shelton, Knoxville, TN (US)

( * ) Notice: Subject to any disclaimer, the term of this patent is extended or adjusted under 35 U.S.C. 154(b) by 0 days.

(21) Appl. No.: 13/442,366

(22) Filed: Apr. 9, 2012

(65) Prior Publication Data

US 2012/0192885 A1    Aug. 2, 2012

Related U.S. Application Data

(60) Division of application No. 13/162,996, filed on Jun. 17, 2011, now abandoned, which is a continuation-in-part of application No. 11/851,866, filed on Sep. 7, 2007, now abandoned, which is a continuation-in-part of application No. 11/121,623, filed on May 4, 2005, now abandoned.

(51) Int. Cl.
*A01M 3/00* (2006.01)

(52) U.S. Cl.
USPC ............. 43/132.1; 43/134; 132/200; 132/148

(58) Field of Classification Search
USPC ................ 43/132.1, 133, 134; 132/217, 75.6, 132/76.4, 76.5, 320, 200, 148; 451/523–525, 451/486, 557, 558; 15/220.3, 220.4, 214, 15/210.1, 209.1, 244.1
See application file for complete search history.

(56) References Cited

U.S. PATENT DOCUMENTS

| | | | | |
|---|---|---|---|---|
| 210,163 A | * | 11/1878 | Steinmetz | 43/134 |
| 466,496 A | * | 1/1892 | Heysinger | 132/137 |
| 487,446 A | * | 12/1892 | Murphy | 15/210.1 |
| 576,211 A | * | 2/1897 | Martin | 15/210.1 |
| 654,486 A | * | 7/1900 | Pederson | 15/214 |
| 741,722 A | * | 10/1903 | Ryder et al. | 15/220.3 |
| 816,227 A | * | 3/1906 | Fosberg | 15/214 |
| 877,960 A | * | 2/1908 | Stafford | 15/220.3 |
| 938,421 A | * | 10/1909 | Hakins | 15/244.1 |
| 1,003,761 A | * | 9/1911 | Lehmann | 15/214 |
| 1,055,739 A | * | 3/1913 | Haas | 451/557 |
| 1,059,440 A | * | 4/1913 | Cochrane | 15/214 |
| 1,065,679 A | * | 6/1913 | Gregson et al. | 30/91.2 |
| 1,172,569 A | * | 2/1916 | Sheafor | 451/557 |
| 1,468,718 A | * | 9/1923 | Kneeland | 15/210.1 |
| 1,511,958 A | * | 10/1924 | Gallipoli | 451/557 |
| 1,631,791 A | * | 6/1927 | Buckley | 15/210.1 |

(Continued)

FOREIGN PATENT DOCUMENTS

FR    2410454 A    *    8/1979

OTHER PUBLICATIONS

Parents Guide How to Treat & Keep Lice Out of Hair, Jul. 2005. Tacoma | Pierce County Health Department [online], [retrieved on Mar. 7, 2013]. Retrieved from the Internet <URL: http://www.tpchd.org/files/library/44a5fe684d9ab036.pdf>.*

*Primary Examiner* — Darren W Ark
(74) *Attorney, Agent, or Firm* — Pitts & Lake, P.C.

(57) ABSTRACT

A nit picking device and method for mechanically stripping nits, eggs, and lice from human hair. The device includes a pair of cooperating tongs each of which is elongated and joined at one end to the juxtaposed end portion of the cooperating tong. The opposite ends of the tong serve to carry an abrasive pad capable of stripping nits from nit laden human hair shafts. As the pads are moved along the length of the hair, the nits are removed from the shafts and in one embodiment captured at least in part in the pads carried by tongs.

5 Claims, 5 Drawing Sheets

U.S. PATENT DOCUMENTS

| | | | | |
|---|---|---|---|---|
| 1,738,754 A * | 12/1929 | Bachleda | | 132/224 |
| 1,801,118 A * | 4/1931 | Smith | | 15/244.1 |
| 1,829,826 A * | 11/1931 | Gaire | | 132/231 |
| 1,905,399 A * | 4/1933 | Wagner | | 15/160 |
| 1,921,002 A * | 8/1933 | Ozabal | | 15/104.5 |
| 1,950,667 A | 3/1934 | Fulton | | |
| 1,951,079 A * | 3/1934 | Zihlman | | 15/220.4 |
| 1,954,742 A * | 4/1934 | Mcswain et al. | | 451/523 |
| 2,055,314 A * | 9/1936 | Seburger | | 15/214 |
| 2,084,485 A * | 6/1937 | Fink | | 15/244.1 |
| 2,148,009 A * | 2/1939 | Bing | | 15/220.4 |
| 2,252,551 A * | 8/1941 | Brollier et al. | | 132/320 |
| 2,295,859 A * | 9/1942 | Murray | | 451/558 |
| 2,413,156 A * | 12/1946 | Tarapczynski | | 451/557 |
| 2,446,653 A * | 8/1948 | Kelly | | 451/525 |
| 2,462,176 A * | 2/1949 | Fryar | | 451/486 |
| 2,477,245 A | 7/1949 | Giddings et al. | | |
| 2,517,089 A * | 8/1950 | Dean | | 15/220.4 |
| 2,518,873 A * | 8/1950 | Eisenberg et al. | | 15/244.1 |
| 2,529,285 A * | 11/1950 | Felton | | 15/220.4 |
| 2,546,526 A * | 3/1951 | Shirley | | 15/220.3 |
| 2,562,465 A * | 7/1951 | Kassel | | 132/119 |
| 2,571,906 A * | 10/1951 | Love | | 15/220.3 |
| 2,585,655 A * | 2/1952 | Ingram | | 451/524 |
| 2,622,256 A * | 12/1952 | Vojacek | | 15/220.3 |
| 2,658,221 A * | 11/1953 | Nicoli | | 15/244.1 |
| 2,683,274 A * | 7/1954 | Kappes | | 15/106 |
| 2,723,412 A * | 11/1955 | Harris | | 15/220.3 |
| 2,735,434 A * | 2/1956 | De Rossett | | 132/76.4 |
| 2,776,667 A * | 1/1957 | Fitz Gerald | | 15/210.1 |
| 2,819,484 A * | 1/1958 | Fouse | | 15/220.3 |
| 2,908,923 A * | 10/1959 | Schlechter | | 15/214 |
| 2,922,218 A * | 1/1960 | Lewis | | 451/484 |
| 2,929,166 A * | 3/1960 | Sneide | | 43/4 |
| 2,958,593 A * | 11/1960 | Hoover et al. | | 451/532 |
| 3,016,059 A * | 1/1962 | Hutton | | 132/217 |
| 3,051,979 A * | 9/1962 | Parsons | | 15/244.1 |
| 3,075,223 A * | 1/1963 | Warner | | 15/220.3 |
| 3,080,594 A * | 3/1963 | Race | | 15/210.1 |
| 3,205,527 A * | 9/1965 | Laird | | 15/244.1 |
| 3,261,094 A * | 7/1966 | Bliss | | 132/75.6 |
| 3,339,561 A * | 9/1967 | Brickner | | 132/217 |
| 3,343,245 A * | 9/1967 | Sylvester | | 451/486 |
| 3,413,673 A * | 12/1968 | Gewirz | | 15/229.13 |
| 3,445,880 A * | 5/1969 | Warner | | 15/220.3 |
| 3,590,414 A * | 7/1971 | Gores | | 15/244.1 |
| 3,603,323 A * | 9/1971 | Avella | | 132/131 |
| 3,608,565 A * | 9/1971 | Ensign | | 132/212 |
| 3,640,031 A * | 2/1972 | Descant | | 451/523 |
| 3,643,386 A | 2/1972 | Grzyil | | |
| 3,998,012 A * | 12/1976 | Ness | | 451/523 |
| 4,065,887 A * | 1/1978 | Shrader | | 451/523 |
| 4,126,962 A * | 11/1978 | Polcaro | | 15/210.1 |
| 4,199,835 A | 4/1980 | Heyer et al. | | |
| 4,279,103 A * | 7/1981 | Rodarte | | 451/523 |
| 4,333,214 A * | 6/1982 | Neumann et al. | | 451/557 |
| 4,455,705 A * | 6/1984 | Graham | | 15/244.2 |
| D274,658 S | 7/1984 | Saferstein et al. | | |
| D275,804 S | 10/1984 | Saferstein et al. | | |
| 4,480,352 A * | 11/1984 | Eggett | | 15/214 |
| 4,621,465 A * | 11/1986 | Pangburn | | 451/524 |
| D289,567 S | 4/1987 | O'Connor et al. | | |
| 4,667,447 A | 5/1987 | Barton | | |
| 4,750,227 A * | 6/1988 | Hopkins et al. | | 451/32 |
| 4,815,232 A * | 3/1989 | Rawski | | 43/136 |
| 4,819,670 A | 4/1989 | Saferstein et al. | | |
| D307,192 S | 4/1990 | Saferstein et al. | | |
| 4,936,259 A * | 6/1990 | Owen et al. | | 132/151 |
| 4,972,543 A * | 11/1990 | Michaels | | 15/220.4 |
| 4,996,735 A * | 3/1991 | Blankenship | | 15/210.1 |
| 5,003,659 A * | 4/1991 | Paepke | | 15/244.1 |
| 5,027,549 A * | 7/1991 | Person | | 43/134 |
| 5,036,561 A | 8/1991 | Calafut | | |
| 5,081,789 A * | 1/1992 | Rhee | | 43/134 |
| 5,095,574 A * | 3/1992 | Khanzadian | | 15/210.1 |
| 5,111,610 A * | 5/1992 | Morisset | | 43/132.1 |
| 5,140,717 A * | 8/1992 | Castagliola | | 15/210.1 |
| 5,222,268 A * | 6/1993 | Snodgrass | | 15/214 |
| 5,273,425 A | 12/1993 | Hoagland | | |
| 5,295,278 A * | 3/1994 | Condon et al. | | 15/244.1 |
| 5,318,051 A * | 6/1994 | Koppel | | 132/219 |
| 5,339,554 A * | 8/1994 | Lippens | | 43/4 |
| 5,377,700 A * | 1/1995 | Harris | | 132/217 |
| 5,417,005 A * | 5/1995 | Hale | | 43/4 |
| 5,435,328 A * | 7/1995 | Grohoske | | 132/120 |
| 5,445,050 A * | 8/1995 | Owens | | 451/558 |
| 5,457,842 A * | 10/1995 | Chang | | 15/214 |
| D365,662 S | 12/1995 | Leman | | |
| 5,537,777 A * | 7/1996 | Geeting | | 43/134 |
| 5,569,064 A * | 10/1996 | Gleadall | | 451/558 |
| 5,591,239 A | 1/1997 | Larson et al. | | |
| 5,636,646 A * | 6/1997 | Zito | | 132/219 |
| 5,759,090 A | 6/1998 | Kawate et al. | | |
| 5,794,377 A * | 8/1998 | Kensok et al. | | 43/134 |
| 5,855,505 A | 1/1999 | Letts | | |
| D408,240 S * | 4/1999 | Garcia | | D8/57 |
| 5,993,306 A | 11/1999 | McCoy et al. | | |
| 6,006,758 A * | 12/1999 | Thorne | | 132/212 |
| 6,086,682 A * | 7/2000 | Anderson | | 15/402 |
| 6,098,633 A * | 8/2000 | Pabari | | 43/112 |
| 6,105,585 A * | 8/2000 | Thomas | | 132/217 |
| 6,115,958 A * | 9/2000 | Enderle | | 43/136 |
| 6,158,443 A * | 12/2000 | Leman et al. | | 132/219 |
| 6,325,071 B1 * | 12/2001 | Butcher | | 132/320 |
| 6,325,708 B1 * | 12/2001 | Miles | | 451/525 |
| 6,339,860 B1 * | 1/2002 | Chen | | 15/214 |
| 6,415,470 B1 * | 7/2002 | Ramrattan | | 15/244.2 |
| 6,524,604 B1 | 2/2003 | Ozelkan et al. | | |
| 6,541,455 B2 | 4/2003 | Pearlman | | |
| 6,565,665 B2 | 5/2003 | Altschuler | | |
| 6,691,713 B1 * | 2/2004 | Altschuler | | 132/200 |
| 6,793,931 B2 | 9/2004 | Precopio | | |
| 6,913,025 B2 * | 7/2005 | Cho | | 132/76.4 |
| 6,991,527 B2 * | 1/2006 | Linzell | | 451/523 |
| 6,994,733 B2 * | 2/2006 | Bartolone et al. | | 132/320 |
| 7,089,945 B1 * | 8/2006 | Barge | | 132/129 |
| 7,117,873 B2 * | 10/2006 | Bachrach et al. | | 132/148 |
| 7,399,330 B2 | 7/2008 | Schwabel et al. | | |
| 7,621,802 B2 | 11/2009 | McCarthy | | |
| 7,789,902 B2 * | 9/2010 | Clayton et al. | | 43/132.1 |
| 7,909,042 B2 * | 3/2011 | Bachrach et al. | | 132/159 |
| 8,104,485 B2 * | 1/2012 | Maor et al. | | 132/126 |
| 8,205,623 B2 * | 6/2012 | Murzynski | | 132/163 |
| 8,215,051 B2 * | 7/2012 | Alexander et al. | | 43/132.1 |
| 2003/0140441 A1 * | 7/2003 | Stafford | | 15/244.1 |
| 2003/0150078 A1 * | 8/2003 | Lottie et al. | | 15/244.1 |
| 2004/0175432 A1 * | 9/2004 | Escudero Gacitua | | 132/219 |
| 2004/0205919 A1 * | 10/2004 | Sims | | 15/209.1 |
| 2005/0155618 A1 * | 7/2005 | Lafferty | | 132/317 |
| 2005/0261740 A1 * | 11/2005 | Clayton et al. | | 132/229 |
| 2006/0085937 A1 * | 4/2006 | Norris | | 15/244.1 |
| 2006/0090771 A1 * | 5/2006 | Ramet | | 132/200 |
| 2006/0130393 A1 | 6/2006 | Clayton et al. | | |
| 2006/0243293 A1 * | 11/2006 | Lanne | | 132/163 |
| 2006/0248785 A1 | 11/2006 | Shelton | | |
| 2007/0011837 A1 * | 1/2007 | Hinojosa | | 15/220.4 |
| 2007/0107155 A1 | 5/2007 | Kacher et al. | | |
| 2007/0144548 A1 * | 6/2007 | Feng et al. | | 132/76.4 |
| 2007/0295350 A1 * | 12/2007 | Shelton | | 132/137 |
| 2008/0032614 A1 | 2/2008 | Stuhlmacher | | |
| 2008/0229532 A1 * | 9/2008 | Abodreham | | 15/160 |
| 2008/0276954 A1 * | 11/2008 | Pienaar | | 132/212 |
| 2009/0036845 A1 * | 2/2009 | Smith | | 132/212 |
| 2009/0163127 A1 | 6/2009 | David et al. | | |
| 2009/0227188 A1 | 9/2009 | Ross | | |
| 2009/0233528 A1 | 9/2009 | Mansfield | | |
| 2009/0235949 A1 * | 9/2009 | Ritterband et al. | | 132/212 |
| 2009/0314305 A1 * | 12/2009 | Bachrach et al. | | 132/200 |
| 2010/0000559 A1 * | 1/2010 | Pabari et al. | | 132/126 |
| 2010/0086577 A1 * | 4/2010 | Munoz et al. | | 132/148 |
| 2011/0005540 A1 * | 1/2011 | Maor et al. | | 132/147 |
| 2011/0083689 A1 * | 4/2011 | Andrews | | 132/76.4 |
| 2011/0120487 A1 * | 5/2011 | Rollat-Corvol et al. | | 132/221 |
| 2012/0085363 A1 * | 4/2012 | Ritterband et al. | | 132/212 |

* cited by examiner

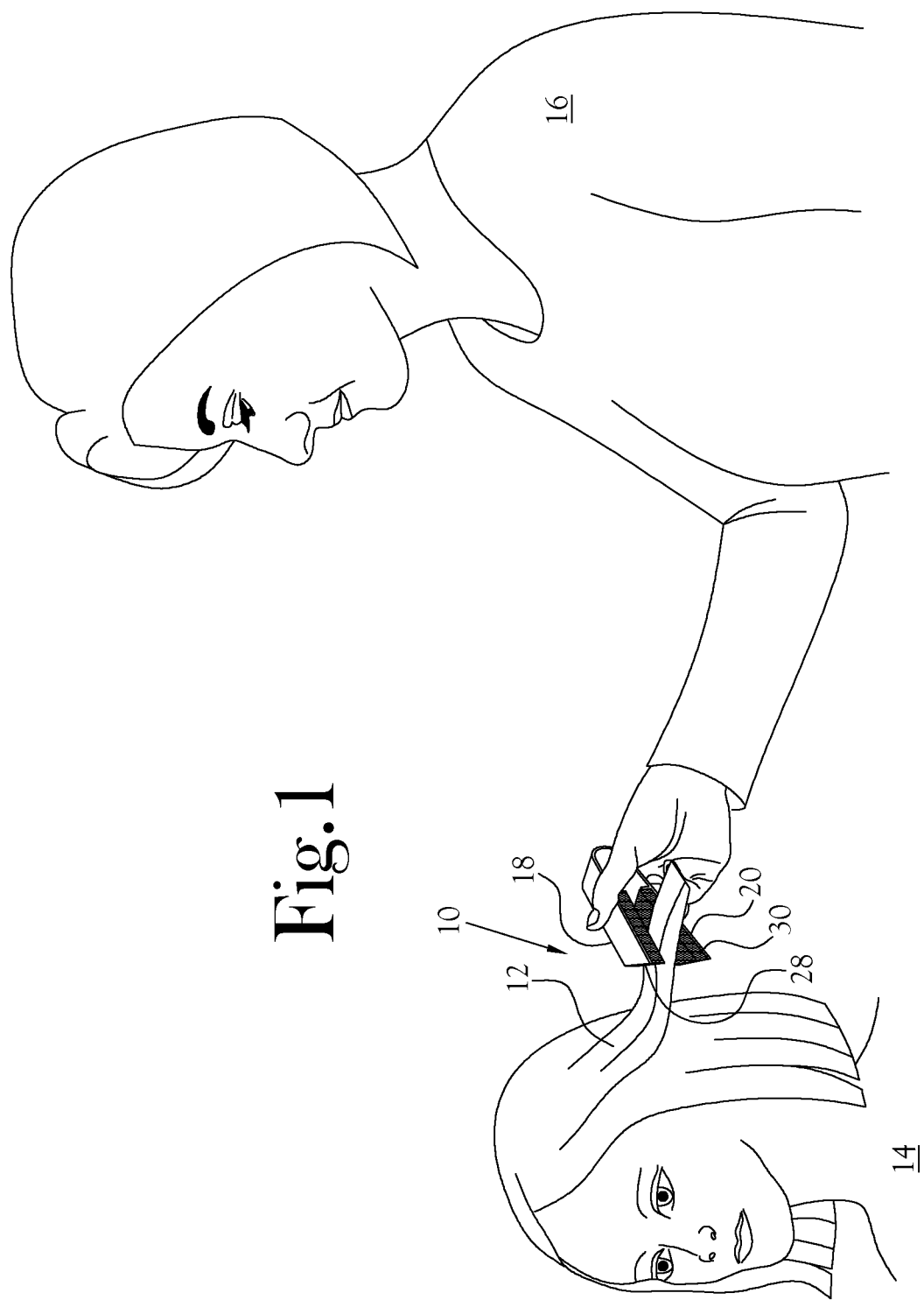

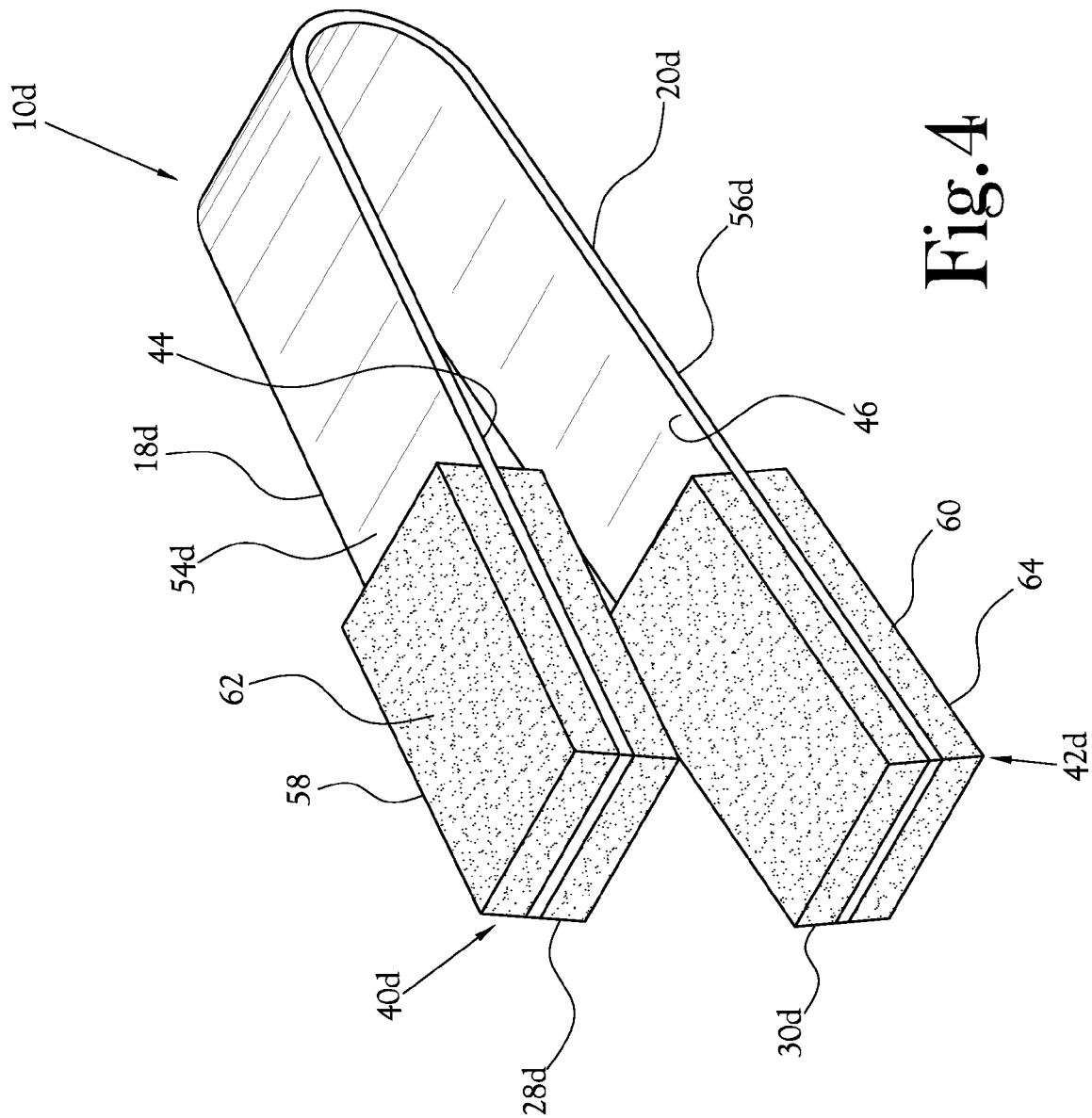

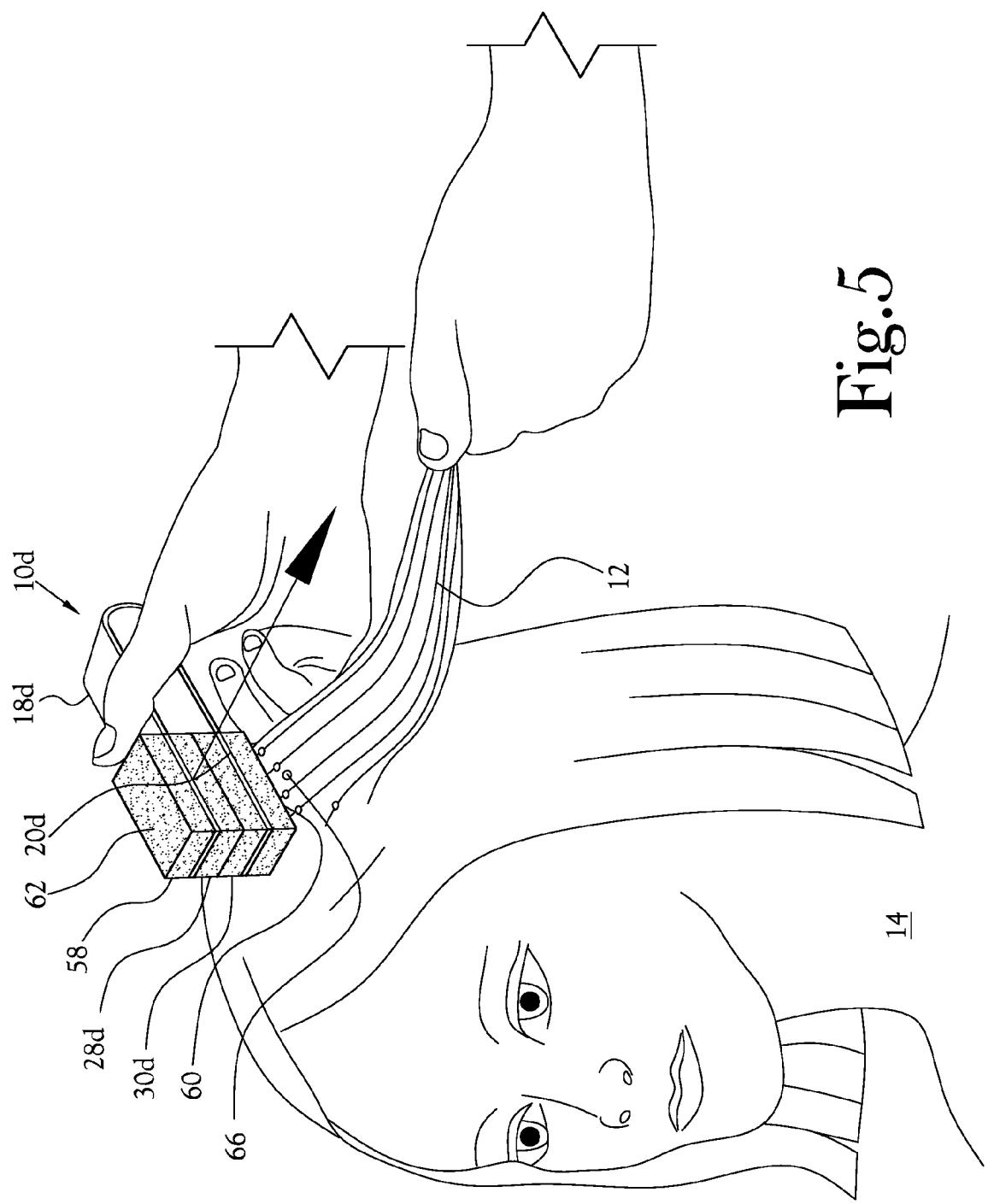

NIT STRIPPING DEVICE AND METHOD

CROSS-REFERENCE TO RELATED APPLICATIONS

This application is a divisional application of U.S. patent application Ser. No. 13/162,996, filed Jun. 17, 2011, which is a continuation-in-part application of U.S. patent application Ser. No. 11/851,866, filed Sep. 7, 2007, which is a continuation-in-part application of U.S. patent application Ser. No. 11/121,623, filed May 4, 2005.

STATEMENT REGARDING FEDERALLY SPONSORED RESEARCH OR DEVELOPMENT

Not Applicable

BACKGROUND OF THE INVENTION

1. Field of Invention

This invention pertains to a method and device for removing nits, eggs and lice from human hair and more specifically concerns a method and device which serves to mechanically strip nits from human hair as abrasive pads or other suitable material are moved along the length of nit-laden hair shafts gripped therebetween.

2. Description of the Related Art

Mechanical devices suitable for extracting nits, eggs, and lice (hereinafter, collectively, "nits") from human hair have hereto before been known. Known devices generally include a comb having one or more rows of teeth that are selectively spaced to aid in combing nits from human hair. Certain devices such as U.S. Pat. No. 6,098,633, include a plurality of teeth rows spaced such that the first row performs a course combing for nits and a second row of teeth performs a more fine filtering of nits. U.S. Pat. No. 6,086,682 discloses a combing device which is combined with a vacuum cleaner such that nits removed by the closely-spaced comb teeth can be drawn into a vacuum cleaner hose and deposited at a remote location. Other known devices include teeth which may be mechanically adjusted such that the comb can be used for different textures of hair and to aid in cleaning.

Other known devices are shown in the following patents: U.S. Pat. Nos. D274,658, D275,804, D289,567, D307,192, D365,662, 1,950,667, 2,477,245, 4,819,670, 4,936,259, 5,636,646, 6,006,758, 6,158,443, 6,524,604, 6,541,455, and 6,565,665.

BRIEF SUMMARY OF THE INVENTION

The present invention provides a device and method for removing nits from human hair. In one embodiment of the invention, a pair of cooperating tongs carry abrasive pads or sheets of abrasive material. A first substantially elongated tong is pivotably secured proximate a second substantially elongated tong. Each one of the first and second tongs has an inner surface opposing a cooperating inner surface of the other of the first and second tongs, and an outer surface opposite the inner surface of the tong. An abrasive pad is secured to each of the inner surfaces of the first and second tongs. In one embodiment, an abrasive pad is secured to at least one of the outer surfaces of the first and second tongs.

The pads are fabricated from a nonwoven fibrous material at least partially coated with an inorganic abrasive particulate material. In a preferred embodiment, an inorganic abrasive particulate additive at least partially covers the nonwoven fibrous material and serves the purpose of helping to detach the head louse nit from the hair to which it is attached. Human hair shafts laden with nits are engaged between the pads and as the pads are moved in this engagement relationship along the length of the hair, the nits are mechanically separated from the hair shafts. In a one embodiment, the tongs are pivotably connected at one end by a suitable spring mechanism which biases the tongs and the pads carried thereby to an open position ready to receive nit laden hair shafts. In another embodiment, the tongs are integrally formed.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 illustrates use of one embodiment the nit stripping device of the present invention and a method for stripping nits from hair shafts;

FIG. 4 shows another embodiment of a nit stripping device constructed in accordance with several features of the present invention; and FIG. 5 illustrates use of the embodiment of the nit stripping device of FIG. 4 and a method for stripping nits from hair shafts.

DETAILED DESCRIPTION OF THE INVENTION

A nit stripping device incorporating various features of the present invention is illustrated generally at 10 in FIG. 1. This nit stripping device is designed to grip nit laden hair shafts 12 such as shown on the child 14. As will be discussed further below, the operator 16 grips the infested hair shafts 12 with the device 10 and moves it along the length of the hair, as by pulling, whereupon nits, eggs, and lice are stripped therefrom.

Figure 2A:
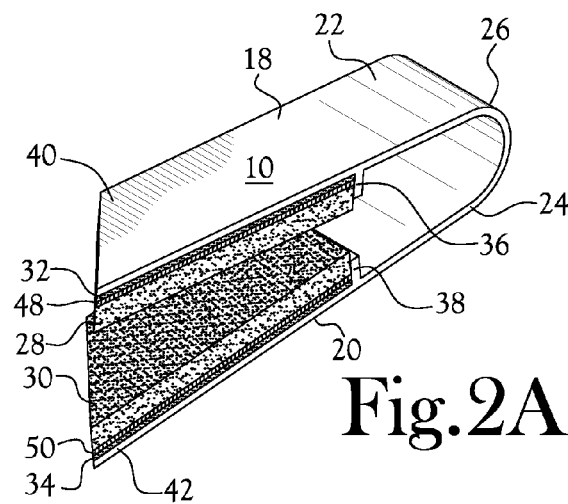
FIG. 2A discloses a perspective view of the nit stripping device of FIG. 1.

To this end, and as shown in FIG. 2A, the device 10 includes a first tong 18 and a second tong 20. Each of the tongs 18, 20 defines a longitudinal axis. The tongs 18, 20 are pivotably connected at proximal end portions 22, 24 respectively, such that the first tong 18 is selectively rotatable proximate the second tong 20 between a first, substantially open position and a second, substantially closed position.

Figure 2B:
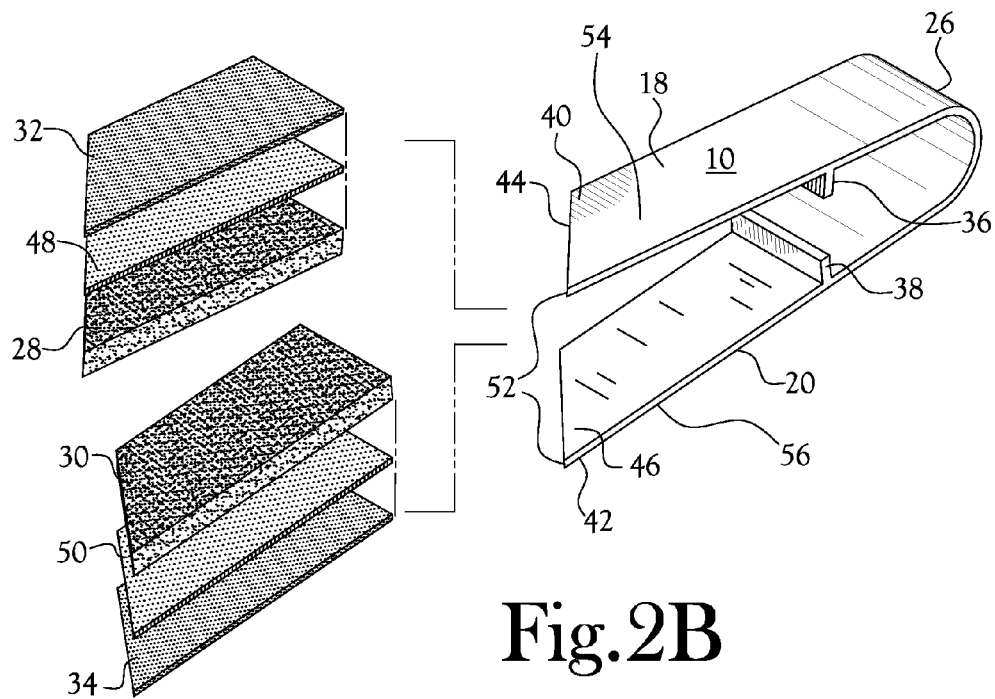
FIG. 2B discloses an exploded view of the nit stripping device of FIG. 2A.
Figure 3A:
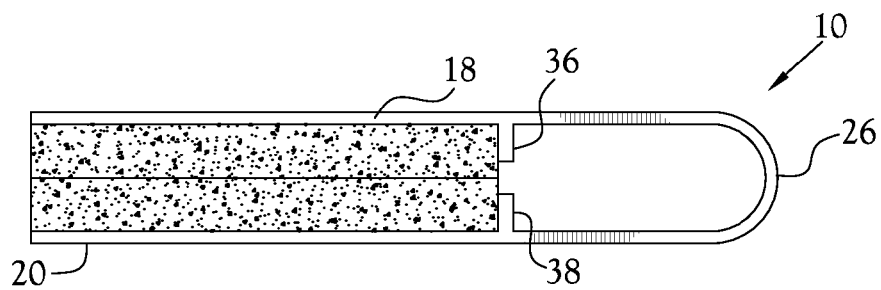
FIG. 3A discloses a side elevation view of the nit stripping device shown in FIGS. 2A and 2B.

In the illustrated embodiment, it is noted that the tongs 18, 20 are fabricated from a pliable material which, in the embodiment shown in FIGS. 2A, 2B, and 3A, form an elongated bent portion of plastic, aluminum or the like, such that the joined proximal ends 22, 24 are connected by the integrally formed arcuate section 26 shown in FIGS. 2A, 2B, and 3A. Those skilled in the art will recognize other suitable configurations for accomplishing a pivotal connection between proximal end portions 22, 24 and such other configurations may be used without departing from the spirit and scope of the present invention. For example, in another embodiment, a hinged connector incorporating a compression spring connects the pivotably connected ends of the tongs for biasing the tongs toward an open position.

Referring now to FIGS. 2A and 2B, distal ends 40, 42 of the tongs 18, 20 include first and second opposing inner surfaces 44, 46, respectively, and first and second outer surfaces 54, 56, respectively. In the illustrated embodiment, pads 28, 30 are mounted to the inner surfaces 44, 46 of the tongs 18, 20, respectively, proximate the distal ends 40, 42. The pads 28, 30 are fabricated at least in part from a nonwoven fibrous material. In several embodiments, the nonwoven fibrous material is prepared from nylon or other synthetic polymer which is drawn to develop molecular orientation and mechanical strength. In a preferred embodiment, the synthetic fibers are drawn to exhibit an average diameter of approximately 50 micrometers, however, those skilled in the art will recognize other sizes of synthetic fibers suitable for fabrication of the pads 28, 30. The fibrous material is at least partially coated with an inorganic abrasive particulate which serves the purpose of helping to detach a nit 66 from a hair to which it is attached. The abrasive particles may be of various sizes, but preferably exhibit an average diameter of between one and 50 micrometers.

The particulate-coated fibrous material is randomly dispersed to form the nonwoven pads 28, 30. The nonwoven pads 28, 30 are formed so as to be sufficiently abrasive to strip nits or lice from strands of hair when the strands of hair are moved between the pads, yet are also sufficiently resilient to allow the hair to move between the pads without resulting in shear failure of the hair strands. In one embodiment, the abrasive particulates are attached to the surface of the synthetic fibers with a binder. In another embodiment, the abrasive particulates are incorporated into the synthetic fibers during formation of the fibers into the random dispersion pattern to form the pads 28, 30. Those skilled in the art will recognize other suitable methods for forming the pads 28, 30, and such methods may be used without departing from the spirit and scope of the present invention.

Referring now to FIG. 2B, in one embodiment the pads 28, 30 are releasably mounted to the inner surfaces 44, 46 of the tongs 18, 20 by suitable hook and loop fastener strips 32, 34. These strips are secured to cooperating hook and loop fastener members 48, 50 carried on the juxtaposed and operatively mounted pads 28, 30. In the embodiment of FIGS. 2A, 2B, and 3A, suitable stops 36, 38 are provided to assist in the placement of the pads 28, 30, respectively, in a proper alignment with each other. In the illustrated embodiment, each stop 36, 38 is defined by a wall integrally formed with and extending from one of the tongs 18, 20. The stops 36, 38 are positioned along the distal end inner surfaces 46, 48 such as to align the pads 28, 30 along the tongs 18, 20 to substantially register the pads 28, 30 with one another. In more discreet embodiments, each of the pads 28, 30 defines a longitudinal axis, thereby allowing the pads 28, 30 to be secured to the tongs 18, 20 in such a configuration that the longitudinal axis of each of the pads 28, 30 extends substantially parallel to and along the longitudinal axis of the cooperating tong 18, 20, respectively.

In several embodiments, such as the embodiment shown in FIGS. 1 through 2B, the distal ends 40, 42 and cooperating pads 28, 30 are tapered along the length of the tongs 18, 20. As best shown in FIG. 1, the taper of the distal ends 40, 42 equips each of the tongs 18, 20 with a substantially pointed end 52, which serves to assist the operator 16 in gathering a section of infested hair shafts 12 for placement between the pads 28, 30 for stripping of nits therefrom. Of course, those skilled in the art will recognize that such tapering along the length of the tongs 18, 20 merely provides a convenience to the operator 16 in gathering invested hair shafts 12. As such, tapering of the distal ends and cooperating pads may be omitted from certain other embodiments without departing from the spirit and scope of the present invention.

As shown in FIGS. 2A and 3A, with the pads 28, 30 mounted to the inner surfaces 44, 46 of the tongs 18, 20, the tongs 18, 20 are selectively rotatable between the first and second positions such as to allow the pads 28, 30 to be brought into and out of proximity with one another. Referring to FIG. 3A, with the device 10 in the first position, the first tong 18 is brought into close proximity to the second tong 20, thereby bringing the first pad 28 into cooperative engagement with the second pad 30. Conversely, in the second position, shown in FIG. 2A, the first tong 18 is rotated away from the second tong 20, thereby moving the first pad 28 out of engagement with the second pad 30.

Figure 3B:
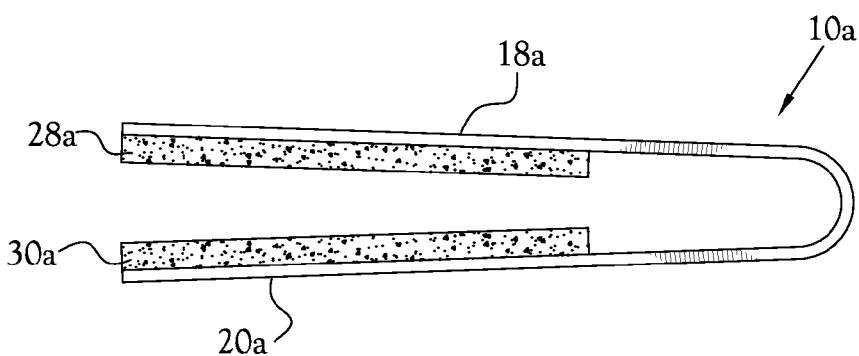
FIG. 3B discloses another embodiment of a nit stripping device constructed in accordance with several features of the present invention.

FIG. 3B, illustrates an alternate embodiment of the device 10a which is provided with tongs 18a, 20a which do not include the stops shown in FIGS. 2A, 2B, and 3A. It will also be noted that the pads 28a, 30a used in connection with the device 10a in FIG. 3B are of a lesser thickness than the pads shown in connection with the device illustrated in FIGS. 2A, 2B, and 3A.

Figure 3C:
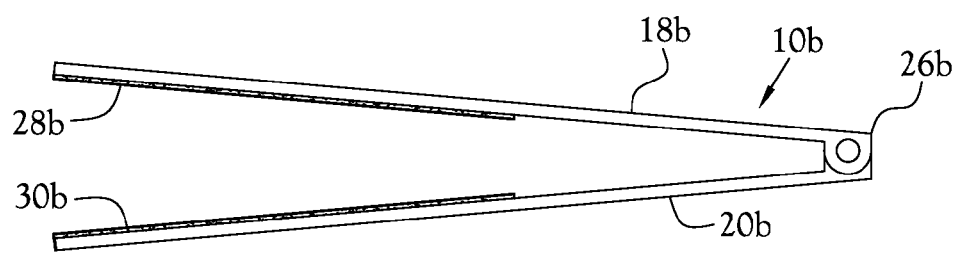
FIG. 3C discloses another embodiment of a nit stripping device constructed in accordance with various features of the present invention having a thin layer of abrasive material mounted at stripping ends of the tongs.

The thicker pads 18, 20 shown in FIGS. 2A, 2B, and 3A serve both to strip the nits from the hair shafts and to capture the stripped nits within the pads themselves. In several embodiments, the pads 18, 20 are selectively removable and replaceable, thereby allowing the pads 18, 20 to be discarded after use. FIG. 3C illustrates another embodiment of the nit stripping device 10b having thin layers of pad material 28b, 30b mounted on the gripping end portions of the tongs.

These thin layers of pad material 28b, 30b serve to mechanically grip the nit laden hair and strip the nits therefrom. The pad materials 28b, 30b are porous, and thus allow the nits to be trapped and/or embedded in the pores, and thereby to be captured. It will also be noted that the device 10b shown in FIG. 3C is provided with a hinge connection 26b that mechanically joins the juxtaposed and pivotably connected ends of the tongs 18b, 20b. In this embodiment, the hinge connection 26b is unbiased. Thus, a user would need to mechanically open and close the tongs 18b, 20b for receiving and gripping the hair respectively. It will also be noted that this connection 26b provides less spacing between the tongs 18b, 20b than is shown in connection with FIGS. 2A, 2B, and 3A, since the effective thickness of the thin layers of pad material 18b, 20b is of a lesser thickness than shown in connection with FIGS. 2A, 2B, and 3A.

Figure 3D:
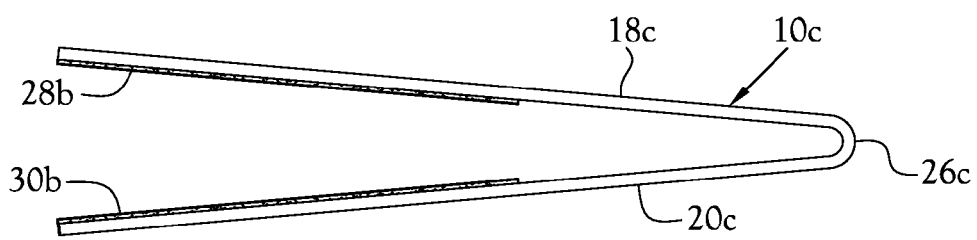
FIG. 3D shows another embodiment of a nit stripping device constructed in accordance with several features of the present invention, in which the connected ends of the tongs are integrally formed.

FIG. 3D shows a nit stripping device 10c incorporating the thin layers of pad material 28b, 30b mounted on the gripping and stripping ends of tongs 18c, 20c. This embodiment of the device includes an integral connection 26c which joins the pivotably connected ends of the tongs 18c, 20c. The integral connection 26c provides lesser spacing between the tongs 18c, 20c than that shown in connection with FIGS. 2A, 2B, and 3A to aid mechanical connection and gripping and stripping of the hair between the thin layers of pad material 18b, 20b.

FIG. 4 illustrates another embodiment of the nit stripping device 10d, in which the distal ends 40d, 42d of the tongs 18d, 20d and cooperating inner pads 28d, 30d are not tapered, and define a substantially rectangular profile. In the embodiment of FIG. 4, additional outer pads 58, 60 are mounted to the outer surfaces 54d, 56d of the tongs 18d, 20d, respectively, proximate the distal ends 40d, 42d. The additional outer pads 58, 60 provide external stripping surfaces 62, 64 which are more easily placed proximate roots of adjacent hair shafts (see FIG. 5), and are sufficiently abrasive to strip nits 66 from portions of strands of hair proximate the hair roots when the strands of hair are moved along the external stripping surfaces 62, 64, yet are also sufficiently resilient to allow the hair to move along the external stripping surfaces 62, 64 without resulting in shear failure of the hair strands. In the illustrated embodiment of FIG. 4, each of the inner and outer pads 28d, 30d, 58, 60 is fixed along respective portions of the tongs 18d, 20d by means readily known to one of ordinary skill in the art, such as by an adhesive fastener. In another embodiment, each of the inner and outer pads 28d, 30d, 58, 60 is releasably mounted to respective portions of the tongs 18, 20 as described hereinabove.

Referring now to FIG. 1, in operation, a method is provided for removing nits from human hair by first placing nit laden hair shafts 12 between opposed pads 28, 30 formed of the afore-mentioned material. The pads 28, 30 are then biased toward each other, such that the nit laden hair shafts 12 are gripped therebetween. The nits are mechanically stripped from the hair shafts by moving the opposed pads along the length of the hair gripped there between.

In one embodiment, the pads 28, 30 are removably mounted along opposing inner surfaces 44, 46 of a pair of pivotably joined tongs 18, 20, as described hereinabove. In this configuration, the nit laden hair shafts 12 are placed between opposed pads 28, 30 when the tongs are in a substantially open position (see FIG. 2A). Pressure is then applied to rotate the tongs 18, 20 toward a closed position (see FIG. 3A), thereby biasing the pads 28, 30 toward the nit laden hair shafts 12 forming a cooperative engagement with the hair shafts 12. The tongs 18, 20 and cooperating pads 28, 30 are thereafter moved along the length of the nit laden hair shafts 12, whereupon the abrasive material forming the pads 28, 30 engages nits about the hair shafts to remove the nits from the hair shafts.

Referring to FIGS. 4 and 5, in another embodiment, inner pads 28d, 30d are mounted along opposing inner surfaces 44, 46 of a pair of pivotably joined tongs 18, 20, while additional outer pads 58, 60 are mounted to the outer surfaces 54d, 56d of the tongs 18d, 20d, respectively, as described hereinabove. In this configuration, external stripping surfaces 62, 64 of the outer pads 58, 60 are placed along portions of nit laden hair shafts 12 proximate the roots of the hair shafts 12. The external stripping surfaces 62, 64 are moved along the length of the nit laden hair shafts 12, whereupon the abrasive material forming the outer pads 58, 60 engages nits 66 about the hair shafts to relocate the nits along the hair shafts away from the roots. Thereafter, the nit laden hair shafts 12 are placed between the inner pads 28d, 30d when the tongs are in a substantially open position. Pressure is then applied to rotate the tongs 18d, 20d toward a closed position, thereby biasing the pads 28d, 30d toward the nit laden hair shafts 12 forming a cooperative engagement with the hair shafts 12. The tongs 18d, 20d and cooperating pads 28d, 30d are thereafter moved along the length of the nit laden hair shafts 12 away from the roots, whereupon the abrasive material forming the pads 28d, 30d engages nits about the hair shafts to remove the nits from the hair shafts.

From the foregoing detailed description, it will be recognized by those skilled in the art that an improved device and method has been provided for removing as by stripping nits, eggs, and lice from infested human hair shafts. In one embodiment the nit stripping device is provided with suitable abrasive pads that serve to capture the dislodged infestations therein. In another embodiment, the pads are of a thinner design and capable of stripping but not capturing the nits, eggs, and lice. In yet another embodiment, the tongs of the nit picking device itself are designed to mechanically mesh and cooperate for stripping the infestations from the hair shafts.

While the present invention has been illustrated by description of several embodiments and the illustrative embodiments have been described in considerable detail, it is not the intent of the applicant to restrict or in any way limit the scope of the appended claims to such detail. Additional advantages and modifications may readily appear to those skilled in the art. The invention in its broader aspects is therefore not limited to the specific details, representative apparatus and methods, illustrative examples shown and described. Accordingly, departures may be made from such details without departing from the spirit of scope of the applicant's general inventive concept.

What is claimed is:

1. A method for removing nits, eggs, and lice from human hair comprising the steps of:
    providing a pair of abrasive pads, one of said pair of abrasive pads being secured to an inner surface of one tong of a pair of tongs, the other of said pair of abrasive pads being secured to an inner surface of another tong of said pair of tongs, each of said pair of abrasive pads being fabricated from a nonwoven fibrous material at least partially coated with an inorganic abrasive particulate material;
    placing nit-laden hair shafts between opposed pads of abrasive material; biasing the pads toward one another such that the shafts are cooperatively engaged therebetween; and
    mechanically stripping the nits from the hair shafts by moving the opposed pads engaging the hair along a length of the hair.

2. The method for removing nits, eggs, and lice from human hair of claim 1 including first the step of mounting each of said pads on said respective tong inner surfaces.

3. The method for removing nits, eggs, and lice from human hair of claim 1 wherein said step of biasing the pads toward one another is accomplished by applying forces to said pair of tongs such that said pair of pads are moved towards each other to engage said nit-laden hair shafts there between.

4. A method for removing nits, eggs, and lice from human hair comprising the steps of:
    providing a first abrasive pad, a second abrasive pad, and a third abrasive pad, the first abrasive pad being secured to an inner surface of a first tong of a pair of tongs, the second abrasive pad being secured to an inner surface of a second tong of the pair of tongs, the third abrasive pad being secured to an outer surface of the first tong of the pair of tongs, each of said abrasive pads being fabricated from a nonwoven fibrous material at least partially coated with an inorganic abrasive particulate material;
    placing the third abrasive pad against nit-laden hair shafts proximate a root portion of the nit-laden hair shafts;
    mechanically repositioning nits along the nit-laden hair shafts away from the root portion of the nit-laden hair shafts by moving the third abrasive pad along a length of the nit-laden hair shafts away from the root portion of the nit-laden hair shafts;
    placing the nit-laden hair shafts between the first and second abrasive pads;

biasing the first and second pads toward one another such that the nit-laden hair shafts are cooperatively engaged therebetween; and mechanically stripping the nits from the nit-laden hair shafts by moving the first and second abrasive pads engaging the nit-laden hair shafts along the length of the nit-laden hair shafts.

5. The method for removing nits, eggs, and lice from human hair of claim 4 wherein said step of biasing the pads toward one another is accomplished by applying forces to said pair of tongs such that said pair of pads are moved toward each other to engage said nit-laden hair shafts therebetween.

* * * * *